A. JEANTIN.
SUSPENSION DEVICE.
APPLICATION FILED JULY 12, 1919.
1,345,089.
Patented June 29, 1920.
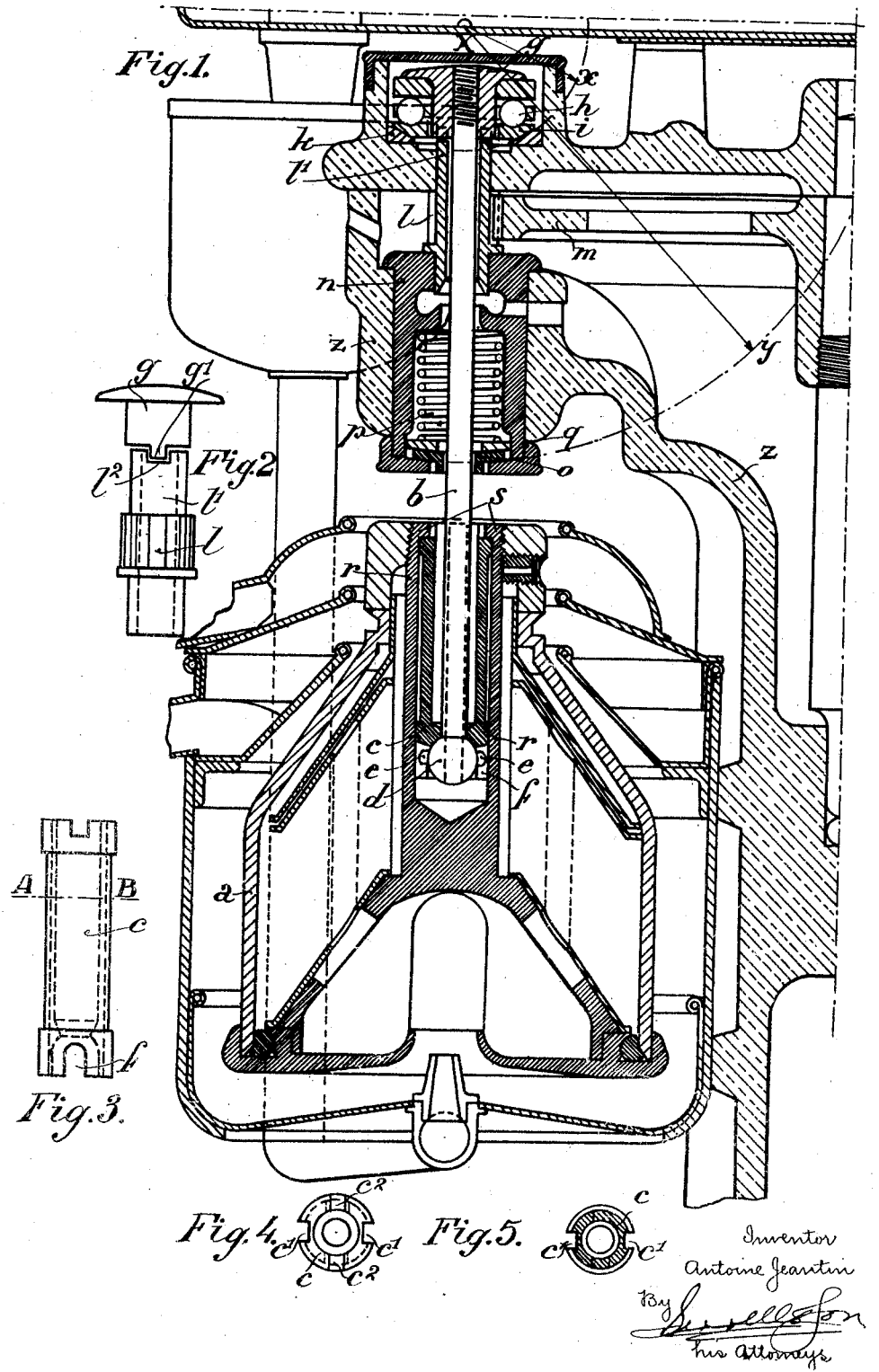

UNITED STATES PATENT OFFICE.

ANTOINE JEANTIN, OF GENEVA, SWITZERLAND.

SUSPENSION DEVICE.

1,345,089.      Specification of Letters Patent.    Patented June 29, 1920.

Application filed July 12, 1919. Serial No. 310,359.

*To all whom it may concern:*

Be it known that I, ANTOINE JEANTIN, engineer, a citizen of The Republic of France, residing at Geneva, Canton of Geneva, in the Confederation of Switzerland, have invented certain new and useful Improvements in or Relating to Suspension Devices, of which the following is a specification.

The object of the present invention is the provision of a device for freely suspending on two ball-joints a member rotating at high speed, one joint being located at the upper or suspension end of the rotary spindle and the second joint at the other end of said spindle and very nearly coinciding with the center of gravity of the member to be moved and supported, this member being free to oscillate and to swing in all directions around the power joint and quite independently of the spindle by which it is suspended, maintaining its equilibrium as its center of gravity lies in the axis of rotation of said spindle which adjusts itself during its movement. Thus at high speeds a very smooth running of the freely suspended member is obtained, avoiding automatically and without any special balancing the lateral pressures on the spindle and the vibrations of the apparatus.

The present device is especially useful for the suspension of centrifugal cream separators.

In the annexed drawing Figure 1 represents such suspension-device in an axial vertical section, Fig. 2 shows the connection between the head of the spindle and the sleeve of the driving pinion.

Fig. 3 is an outside view of sleeve $c$.

Fig. 4 a top view of the sleeve and

Fig. 5 a section on line A—B of Fig. 3.

$a$ is a cream separator suspended by means of spindle $b$ to the stationary part $z$ of the machine frame.

This suspension is obtained by means of two ball-joints whereof the first has its center of oscillation at $x$. This first ball-joint, the spherical surface of which is marked with $x$, acts as support of the head of the spindle $b$. The second ball-joint $d$, fast at the bottom-end of the spindle $b$, is located very nearly at the center of gravity of the whole machine.

A pinion $l$ driven by a driving wheel $m$ is hollow providing a free passage, with lateral play, for the spindle $b$. This spindle is independently and freely fixed above the pinion $l$ and rests with a flat head on a ball bearing $h$ provided with a spherical bearing plate $i$ the center of oscillation of which is at $x$. This arrangement permits any angular displacement of the spindle $b$ by placing the center $x$ of the bearing plate as high as possible, as the spindle near the ball bearing is passing through the hollow hub of the pinion without touching the same. The flat head $g$ of the spindle is provided below the ball-bearing $h$ with two carrier pins $g^1$ projecting from a hub-like portion of the head $g$. These carrier-pins $g^1$ are lodged freely, so as to permit of the oscillations of the spindle $b$, within two slots $l^2$ cut diametrically opposite each other in the hub of the pinion $l$. By these two slots the rotation of pinion $l$ is communicated to the spindle $b$ without the need of any spring and without interfering with the working of the pinion $l$. This pinion therefore acts on the bearing $n$ with its own weight only and takes the axis $b$ along with it simply by tangential action thus transferring to it its own rotating movement.

The lower ball-joint $d$ of the spindle $b$ carries a sleeve $c$ imparting to it its own rotary movement by means of two carrier-pins $e$ engaged freely within the slots $f$ of the concave bottom end of sleeve $c$ without interfering with the balance of the centrifugal machine or cream separator $a$. The spindle $b$ is for the same reason entirely free with a lateral play inside of the sleeve $c$. The sleeve $c$ supports and operates the separator $a$ and is connected to this separator by means of a bayonet joint. To this end the central tube $r$ of the lower part of the separator $a$ is provided at its orifice with two bosses $s$ and the sleeve $c$ is provided with two grooves $c^1$ extending the whole length thereof and at a right angle with these grooves on the upper face end there are two notches $c^2$ corresponding with the bosses $s$ which are adapted to be received therein. When placing sleeve $c$ within the tube $r$, it is necessary to slide the sleeve into said tube with the bosses $s$ engaged within the grooves $c^1$, and when wholly inserted to give a quarter turn to the sleeve so as to bring the notches $c^2$ under the bosses $s$. Then the separator will be supported by the bosses resting within notches $c^2$, consequently the sleeve will slide within the central tube $r$ of the lower part of the separator with slight frictional contact until the lower ball-joint $d$ is located near the center of gravity of the whole separator $a$ that is to say is located at the best point possible for obtaining a rotary movement with the least angular deviations of the separator and the least reaction on the spindle $b$. This is what occurs when the separator oscillates and balances freely in every direction on its center of gravity, as the axis of rotation of the spindle then adjusts itself and passes through the center. Practically this recommends itself because it makes the rotation of the separator stable by locating the ball-joint $d$ to some extent above the effective center of gravity. By this construction small angular disturbances are also corrected automatically, and this is effected by the spindle $b$ which by its free suspension is intended to accomplish this purpose. The axis of the spindle will therefore describe on the center $x$, theoretically, a cone which will be a very small one but will exist nevertheless, but the axis, in spite of this may always be considered as remaining vertical.

About one half of its length and as near to the separator as possible, the spindle $b$ passes freely through a concave guiding washer $o$, which is intended to attenuate the oscillations at the start and stop. This washer may be of metal or fiber and can easily be shifted in any direction by slight friction between the curved surface of a washer $q$ and the bottom of the bearing $n$. The center of this curved surface is $x$ that is the center of the oscillating cup $i$ carrying the whole suspended apparatus. The upper washer $q$ is movable in a vertical direction and is pressed against the washer $o$ under the effect of a spring $p$ but slightly enough as to let this washer follow the lateral variations communicated to it by the spindle $b$ which variations will be attenuated and the axis be guided freely and without any appreciable friction.

The operation of this appartus is as follows;

The pinion $l$ is moved by any suitable mechanism and turns the spindle $b$ along with it by means of the carrier pins or lugs $q^1$ and the notches $l^2$. The spindle $b$ is supported by a pivotable ball-bearing $h$, when rotating moves the separator along with it. This separator $a$ is supported quite freely by means of the sleeve $c$ on the lower ball-joint $d$ being thus free to oscillate and balance in any direction independently from spindle $b$. This independence of the driving axis and of the separator is of a great advantage—which only is rendered possible by the combination of a freely suspended axis with a double ball-joint. The axis of equilibrium and of rotation of the separator will thus form itself automatically and quickly without any thrust or reaction on the spindle and without the need of balancing the separator, which with some unsteadiness at the beginning soon finds its equilibrium, and will waver less and less as the speed increases until abruptly the wavering will be stopped and a steady axis of rotation will be established, after and being entirely steadied the separator may be turned at the highest speeds without appreciable vibration, a regular and light humming noise indicating a perfect running thereof. The spindle $b$ has also contributed to this result by the fact that it attenuates by its conical rotation the small angular deviations produced by the separator and this without causing thereby an appreciable deviation of the same from the vertical line and that it is free of any vibrating movement.

It will be apparent from the foregoing that an exact vertical position of the machine is not absolutely necessary owing to the fact that the separator being suspended will always adjust itself and besides the guide $o$, perfectly free on account of the independent axes will not disturb this automatic adjustment as it is the separator itself which will assume the position most suitable for its running.

Any other means of transmission may be substituted for the pinion $l$, such as a pulley or a worm wheel.

This suspension device may be employed also for other apparatus than a cream separator, for instance for an electrical fan and other similar translating devices.

Claims:

1. A suspension apparatus for centrifugal cream separators and the like, comprising a support, a driving member journaled in the said support, a spindle passing freely through the said driving member, a universal joint connecting the head of a spindle and the driving member, a member to be revolved, and a universal joint connecting the lower end of the spindle with the said member to be revolved at substantially its center of gravity.

2. A suspension apparatus for centrifugal cream separators and the like, comprising a support, a driving member journaled in the said support, a spindle passing freely through the driving member, a universal joint connecting the head of the spindle and the driving member, a ball bearing for the head of the spindle, a member to be revolved, and a universal joint connecting the lower end of the spindle and the member to be revolved for supporting and turning the same.

3. A suspension apparatus for centrifugal cream separators and the like, comprising a support, a sleeve member mounted in the said support, a driving member journaled in the said support and the said sleeve, a spindle passing freely through the said driving member and the said sleeve, a universal joint connecting the head of the spindle and the said driving member, a member to be revolved, and a universal joint connecting the lower end of the spindle to the member to be revolved for supporting and turning the same.

4. A suspension apparatus for centrifugal cream separators and the like, comprising a support, a sleeve member mounted in the support, a driving member journaled in the said support and the said sleeve, the sleeve having a cap with an inner spherical surface, a spindle passing freely through the said driving member and sleeve, a universal joint connecting the said driving member and the head of the spindle, a device within the said sleeve bearing against the spherical surface of the end thereof to regulate the lateral movement of the said spindle, a member to be revolved, and a universal joint connecting the lower end of the spindle and the said member to be revolved to support and turn the same.

5. A suspension apparatus for centrifugal cream separators and the like, comprising a support, a driving member journaled in the support, a sleeve member mounted in the support and having an end with an inner spherical surface, a spindle passing freely through the said driving member and sleeve, a universal joint connecting the said driving member with the head of the spindle, a regulating washer within the said sleeve and bearing against the spherical surface of the end thereof, with the spindle passing through the said regulating washer, means within the sleeve for maintaining the regulating washer against the spherical surface of the end of the sleeve, a member to be revolved, and a universal joint connecting the lower end of the spindle with the said member to be revolved for supporting and turning the same.

6. A suspension apparatus for centrifugal cream separators and the like, comprising a support, a driving member journaled in the support, a sleeve member mounted in the support and having an end with an inner spherical surface, a spindle passing freely through the said driving member and sleeve, a universal joint connecting the said driving member with the head of the spindle, a regulating washer within the said sleeve and bearing against the spherical surface of the end thereof, with the spindle passing through the said regulating washer, a spring within the said sleeve and surrounding the said spindle for maintaining the regulating washer against the spherical surface of the end of the sleeve, a member to be revolved, and a universal joint connecting the lower end of the spindle with the said member to be revolved for supporting and turning the same.

In testimony whereof I affix my signature in presence of two witnesses.

ANTOINE JEANTIN.

Witnesses:
ELMER SCHNEIDER,
ROD DE WURTEMBERG.